April 23, 1940.  C. E. GOLDUP  2,198,196
RAISING AND LOWERING OF AGRICULTURAL IMPLEMENTS
Filed Dec. 10, 1937  2 Sheets-Sheet 1
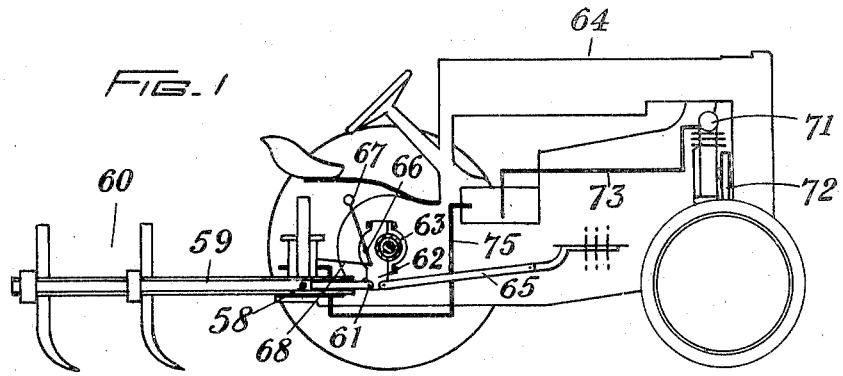
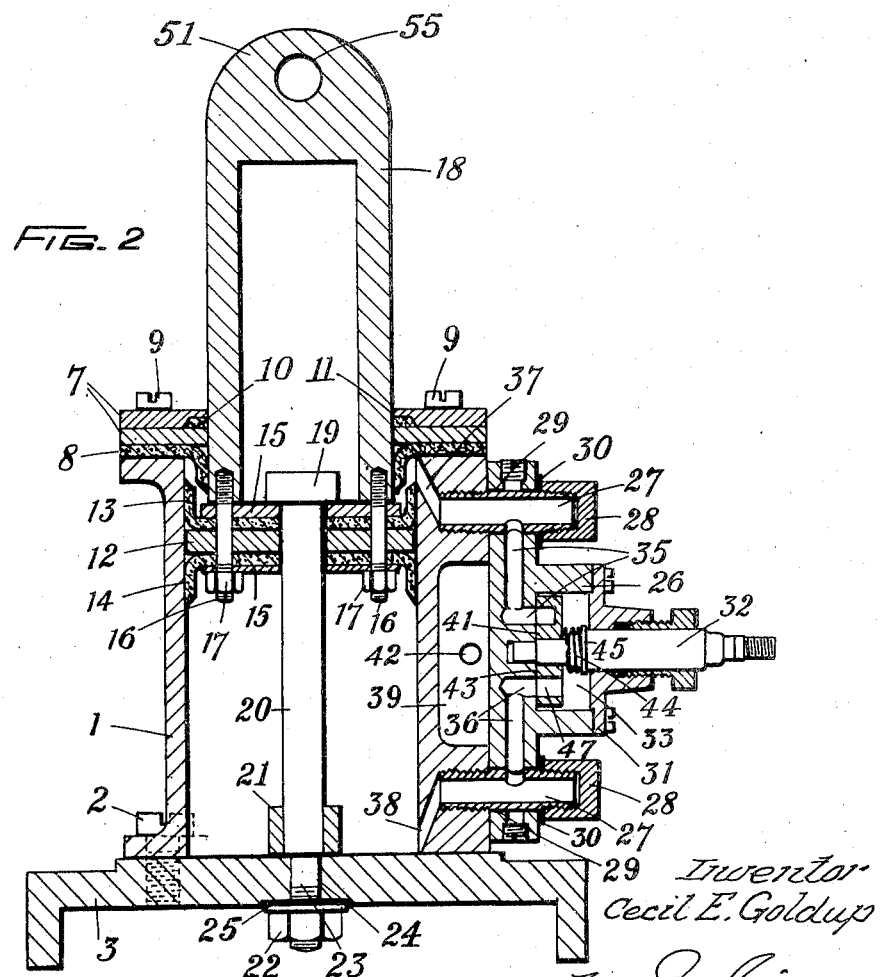
Inventor
Cecil E. Goldup

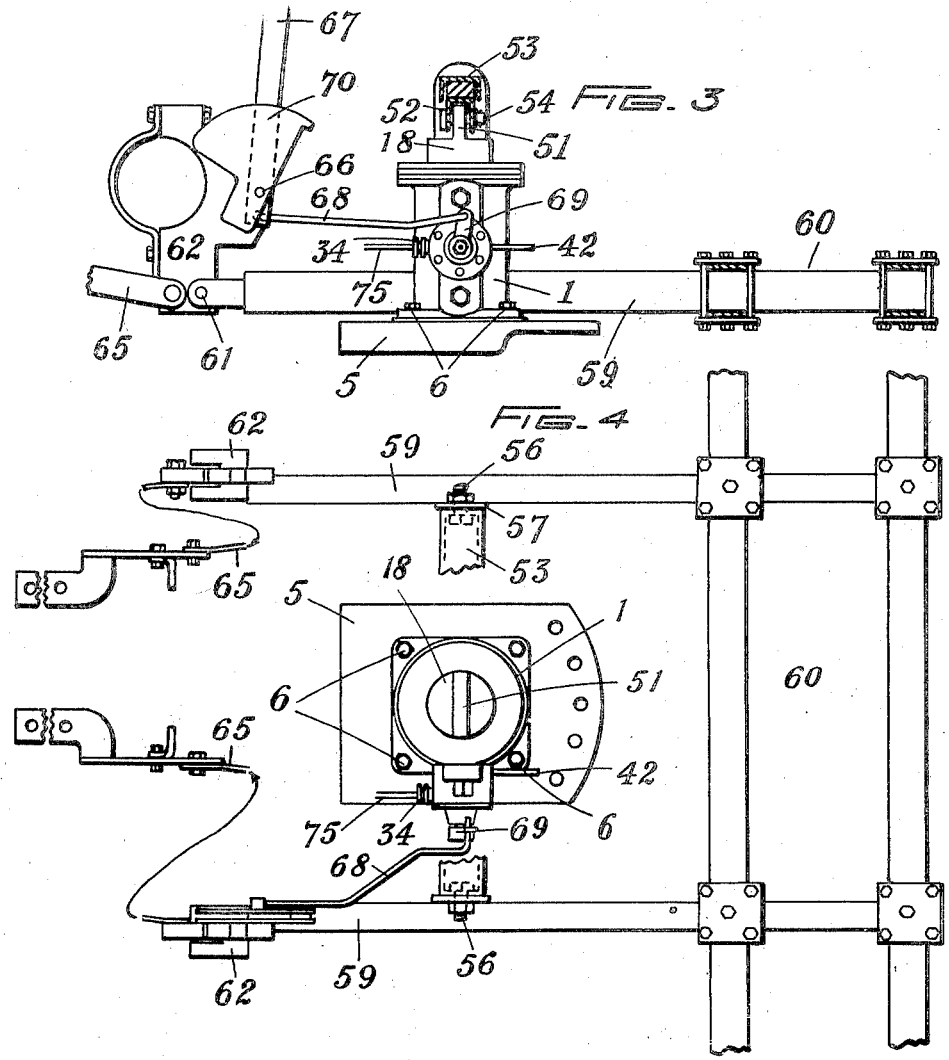

Patented Apr. 23, 1940

2,198,196

UNITED STATES PATENT OFFICE 2,198,196

RAISING AND LOWERING OF AGRICULTURAL IMPLEMENTS

Cecil Edgar Goldup, Ashford, England

Application December 10, 1937, Serial No. 179,208
In Great Britain December 12, 1936

3 Claims. (Cl. 97—50)

This invention has reference to the raising and lowering of cultivators, ploughs, hay-sweeps and other agricultural implements that have tines or the like which need to be lifted and lowered.

According to the present invention there is provided a pneumatic lifting and lowering device comprising a double acting piston one working face of which has a considerably smaller effective area than the other working face. The piston is arranged to be connected to the implement and a cylinder for the piston is arranged to be mounted on a tractor so that movements of the piston with respect to the tractor brought about by compressed air acting on the larger face of the piston cause the tractor to lift whilst opposite movements of the tractor brought about by the air acting on the smaller face thereof press the implement downwardly.

The above arrangement is very advantageous when the implement is being used on ground containing large stones and other obstructions in that downward pressure of the device, although sufficient to keep the implement down to its work, it is not so great as to prevent the implement from yielding upwardly and enables advantage to be taken of the natural resiliency of the air urging the implement downwardly, whilst ample power is available for moving the implement upwardly when so required.

According to a further aspect of the invention there is provided a combination comprising a tractor with a compressor driven thereby, an agricultural implement coupled to the said tractor and a lifting and lowering device as above set forth with a control valve and a mechanical coupling between the piston and the implement in such manner that movements of the piston under the action of the air from the compressor controlled by the valve effect lifting and lowering movements of the implement with respect to the tractor.

Air from the compressor is preferably taken to a receiver and from the receiver to the control valve. The air inlet pipe of the receiver dips into a small quantity of oil in the receiver so that particles of oil mix with the air and are carried to the piston and cylinder to effect lubrication thereof.

In the accompanying drawings:

Fig. 1 is a diagrammatic side view of a combination according to the invention;

Fig. 2 is a section partly in elevation of a lifting and lowering device according to the invention;

Fig. 3 is a side elevation partly in section of the said device applied to an implement, part only of the implement being shown, and supported by the drawbar plate of a tractor;

Fig. 4 is a plan view of the arrangement shown in Fig. 3 and includes the crank case ends of the ties used in attaching the implement to a tractor;

Fig. 5 is a front elevation of a valve disc for controlling the admission of air to and the exhaust of air from the pneumatic cylinder of the present device;

Fig. 6 is a view of the valve face with which the disc shown in Fig. 5 co-operates; and Fig. 7 is a diagrammatic sectional elevation of the air receiver.

The device comprises a cylinder 1 secured at its lower end by means of screws such as 2 or by any other suitable means to the top face of a cap 3. The said cap is attached to the drawbar fitting 5 of a tractor by means of bolts 6. The cap closes the bottom of the cylinder. At the top of the cylinder are rings 7 which in addition to acting as clamping rings for a hat leather 8 when screws such as 9 are tightened, retain packing 10 within a groove 11 in the inner peripheral portion of the underside of the upper ring 7.

Within the cylinder is a piston comprising a centre ring 12, oppositely set cup leathers 13 and 14, respectively, at the top and bottom thereof, clamping rings 15 and securing studs 16 with nuts 17, said studs screwing into the bottom end of a hollow piston rod 18 extending upwardly from the piston past the hat leather 8 and the packing 10.

It will be seen that the diameter of the rod 18 is not a great deal less than the diameter of the piston so the effective area of the top working face of the piston is considerably less than that of the bottom working face thereof.

The head 19 of a bolt 20 upstanding from the cap 3 limits the upward stroke of the piston and a collar 21 near the bottom of the bolt limits the downward stroke thereof said bolt being secured to the cap by means of a nut 22 on the shank 23 passing through a central hole 24 in the cap 3. The hole is sealed by a washer 25.

One side of the cylinder 1 has the body 26 of a control valve secured to it. The securing is effected by mean of externally screw-threaded tubes 27 and cap nuts 28. One end of each tube screws into the cylinder, the valve body is bored at 29, 29 to enable it to be slipped onto the tubes and the nuts 28 are tightened against sealing washers 30 between the nuts and the outer face of the body 26. A cover plate 31 provides a bearing for the stem 32 of the valve and closes an air chest 33. Air is fed to the chest through a gland 34 (Figs. 3 and 4). Ducts 35 and 36 in the body 26 communicate with the chest 33 and with the hollow of the tubes 29; and ducts 37 and 38 communicate with the top and bottom, respectively, of the hollow of the cylinder 1 and with the tubes 27. In this manner two passages are provided between the chest 33 and the interior of the cylinder 1. Within the wall of the cylinder is an exhaust chamber 39 and in the body 26 is an exhaust passage 40 (Fig. 6) which would place the chest 33 in communication with the chamber 39 were it not for the intervention of the valve disc 41. Air escapes from the chamber 39 to atmosphere through the passage 42.

The disc 41 is secured to the squared end of the stem 32 and is urged into close contact with the face 43 by a spring 44 between the disc and a flange 45 on the stem. The disc has two transverse holes 46 and 47 and a tangential hole 48, stopped at its ends but provided with back ports 49 and 50. The holes 46 and 47 control the inlet of compressed air to the ducts 35 and 36 and the ports 49—50, holes 48 and 40 control the passage of air to the chamber 39.

The top of the rod 18 is tongued at 51. The tongue lies within a shoe 52 of inverted U-shape on the underside and at the centre of the yoke 53 of an inverted stirrup; and the shoe and the rod are jointed together by means of a pin 54 passing through the shoe and through a hole 55 in the said tongue.

The ends of the yoke are jointed by means of bolts and nuts 56 to the limbs 57 of the stirrup and the bottoms of the said limbs are jointed at 58 to the longitudinal members 59 of the cultivator generally indicated by 60.

The forward end of the cultivator is jointed at 61 in known manner to blocks 62 mounted in freely rotatable manner on the axle casing 63 of the tractor generally indicated by 64. The blocks are tied in known manner by members 65 jointed at their rear ends to the block and anchored at their forward ends to the crank case of the tractor engine.

One of the blocks bears the pivot 66 of a control lever 67 for the valve. The lever is connected to the valve by means of a push-pull rod 68 and an arm 69 fixed to the stem 32. A segment 70 limits the angle through which the lever is moved by contact with the back axle casing and with a projection suitably located on the tractor.

A compressor 71 is fitted on the front of the engine and driven by a belt 72 from the crank shaft. A pipe 73 conducts compressed air to the receiver 74 and a second pipe 75 conducts the air from the receiver to the valve, said pipe 75 being connected to the valve by the gland 34. The receiver end of the pipe 73 dips into a small quantity of oil 76 at the bottom of the receiver so that the air picks up particles of oil and the pipe 75 conducts them to the valve and to the piston and cylinder. The end of the pipe 75 projects well into the receiver to prevent oil splashing or directly flowing into it.

When it is desired to lower the implement the lever 67 is operated to cause it, through the rod 68, arm 69 and stem 32 to turn the disc 41 into a position such that hole 46 registers with the upper conduit 35, and the exhaust passage including the hole 48 and ports 49—50 place the lower conduit 36 into communication with the hole 40. Air from the chest 33 can thus pass to the upper end of the cylinder to depress the piston and the air in the lower end of the said cylinder can escape to atmosphere.

The air acting on the top of the piston is confined to the annulus around the bottom of the rod 18 so although this air is at high pressure the downward pull of the piston is such that upward forces on the implement caused by obstructions can move against the air pressure.

When, however, considerably more force is required to lift the implement the appreciably larger working area on the underside of the piston is utilized. Air is admitted to the lower part of the cylinder so as to act on the said underface by manipulating the lever to cause it to turn the hole 47 into register with the duct 35 and to place the exhaust passage comprising the ports 50 and 49 and the hole 48 into communication with the duct 35 and the hole 40.

It will be understood that if the valve be so operated to cause the piston to move to an intermediate position the said piston and, therefore, the implement will be held in very resilient manner, air being trapped both at the top and at the bottom of the cylinder.

What I claim is:

1. An agricultural implement lifting and lowering device comprising a double-acting piston one working face of which has a considerably smaller effective area than the other and which is arranged to be connected to the implement, and a cylinder containing the piston arranged to be mounted on a tractor so that movements of the piston with respect to the tractor brought about by compressed air acting on the larger face of the piston cause the implement to lift whilst opposite movements of the tractor brought about by the air acting on the smaller face thereof force the implement downwardly, the upward and downward strokes of the piston being limited by a stop device comprising a bolt having a head at one end engageable with one face of the piston and a shoulder adjacent the other end engageable with the other face of the piston.

2. A combination comprising a tractor with a compressor driven thereby, an agricultural implement coupled to the said tractor, a double-acting pneumatic lifting and lowering device with a control valve and a mechanical coupling between the piston and the said device and the implement in such a manner that movements of the piston under the action of the air from the compressor controlled by the valve effect lifting and lowering movements of the implement with respect to the tractor, and an air receiver between the compressor and said device, said receiver having an air inlet pipe arranged to dip into oil in the receiver so that particles of oil are picked up by the air and transferred to said device.

3. In a lifting and lowering device for the tools of agricultural implements, a fixed vertical cylinder having a head at its upper end provided with a central opening having a diameter but slightly less than that of the cylinder, a piston reciprocable in the cylinder, a piston rod fitting in and slidable in said opening, said cylinder having ports above and below the piston at the ends of the cylinder, oppositely facing cup packings carried by said piston, and a downwardly facing cup packing supported between the cylinder and said head and fitting against the piston rod.

CECIL EDGAR GOLDUP.